(12) United States Patent
Jalenques

(10) Patent No.: US 10,434,662 B2
(45) Date of Patent: Oct. 8, 2019

(54) GRIPPING DEVICE FOR LINEAR ACTUATION

(71) Applicant: Interscience, St Nom la Breteche (FR)

(72) Inventor: Emmanuel Jalenques, St Nom la Breteche (FR)

(73) Assignee: INTERSCIENCE, St Nom la Brèteche (FR)

( * ) Notice: Subject to any disclaimer, the term of this patent is extended or adjusted under 35 U.S.C. 154(b) by 0 days.

(21) Appl. No.: 15/876,857

(22) Filed: Jan. 22, 2018

(65) Prior Publication Data

US 2018/0207807 A1 Jul. 26, 2018

(30) Foreign Application Priority Data

Jan. 23, 2017 (FR) ..................................... 17 50528

(51) Int. Cl.
| | | |
|---|---|---|
| *B25J 15/02* | (2006.01) | |
| *B25J 15/08* | (2006.01) | |
| *B23Q 7/04* | (2006.01) | |
| *B25J 19/02* | (2006.01) | |
| *B25J 15/00* | (2006.01) | |

(52) U.S. Cl.
CPC .......... *B25J 15/0226* (2013.01); *B23Q 7/046* (2013.01); *B25J 15/022* (2013.01); *B25J 15/026* (2013.01); *B25J 15/086* (2013.01); *B25J 19/02* (2013.01); *B25J 15/0028* (2013.01); *B25J 15/0273* (2013.01)

(58) Field of Classification Search
CPC .. B25J 15/0253; B25J 15/026; B25J 15/0273; B25J 15/028; B25J 15/0286; B25J 15/0293; B25J 15/106; B25J 15/0226; B25J 15/086; B25J 15/022; B25J 15/0028; B25J 19/02; B66F 9/183; B23Q 7/046
USPC ....................................................... 294/103.1
See application file for complete search history.

(56) References Cited

U.S. PATENT DOCUMENTS

| | | | | |
|---|---|---|---|---|
| 4,621,852 A | * | 11/1986 | Maki ........................ | B25J 15/10 294/67.22 |
| 4,699,414 A | * | 10/1987 | Jones ..................... | B25J 15/026 294/119.1 |

(Continued)

FOREIGN PATENT DOCUMENTS

| | | |
|---|---|---|
| EP | 2719506 A1 | 4/2014 |
| EP | 3098035 A1 | 11/2016 |

(Continued)

*Primary Examiner* — Stephen A Vu
(74) *Attorney, Agent, or Firm* — Thomas P. O'Connell; O'Connell Law Firm

(57) ABSTRACT

A gripping device with linear actuation for a robotic arm for seizing and gripping Petri dishes and other light items. The gripping device has a support and first and second gripping arms slidably retained relative to the support by guide rods. A motorized drive mechanism actuates the gripping arms through an operating member that acts only on the first gripping arm. Through an interconnection mechanism, movement of the first gripping arm actuates a simultaneous and dependent opposite movement of the second gripping arm so that the gripping arms are movable between a slack position and a clamping position. The operating member acts on the first gripping arm through a resiliently compressible member, the distortion of which is measured to provide a clamping limitation mechanism.

23 Claims, 3 Drawing Sheets

(56) References Cited

U.S. PATENT DOCUMENTS

| | | | | |
|---|---|---|---|---|
| 5,681,530 A * | 10/1997 | Kuster | ............... | G01N 35/0099 422/536 |
| 8,690,213 B2 * | 4/2014 | Harada | ................ | B25J 15/0057 294/119.1 |
| 9,335,337 B2 * | 5/2016 | Jones | ................. | G01N 35/0099 |

FOREIGN PATENT DOCUMENTS

| | | |
|---|---|---|
| JP | S5761486 A | 4/1982 |
| JP | S58160089 A | 9/1983 |
| JP | S58184286 U | 12/1983 |
| JP | S6056887 A | 4/1985 |
| JP | S615587 U | 1/1986 |
| JP | H04372387 A | 12/1992 |

\* cited by examiner

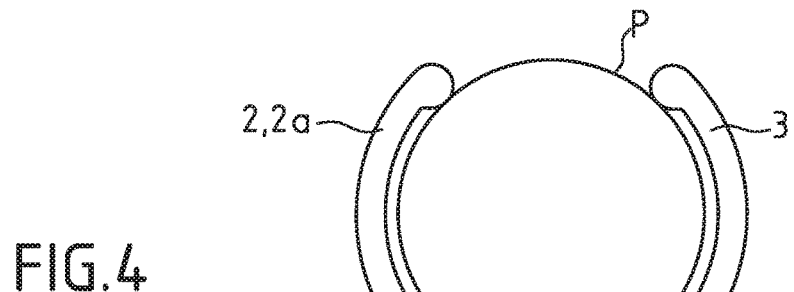
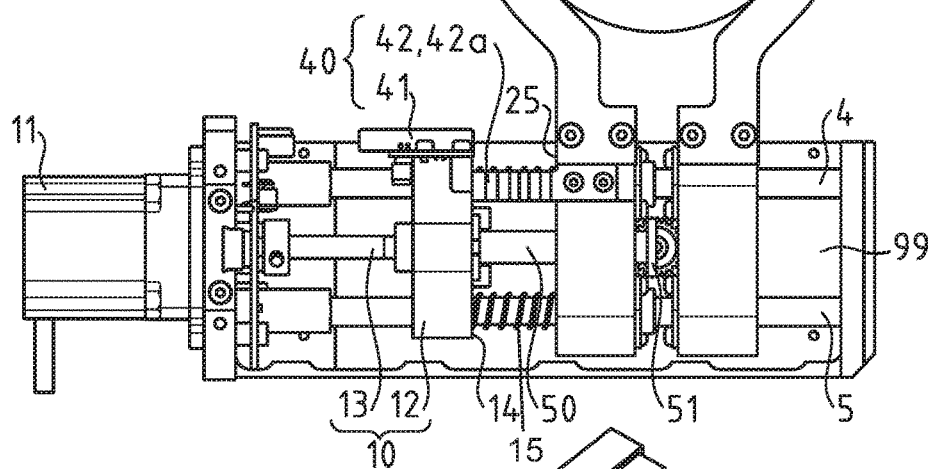
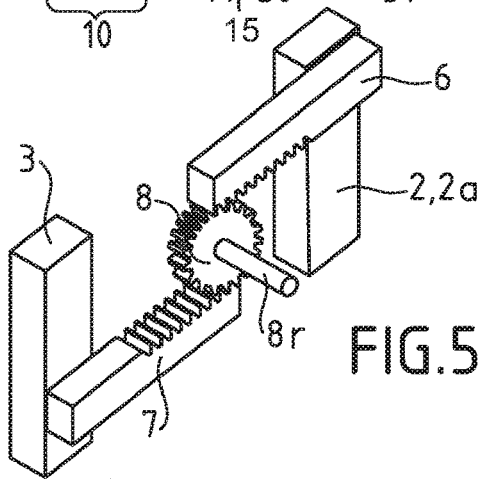
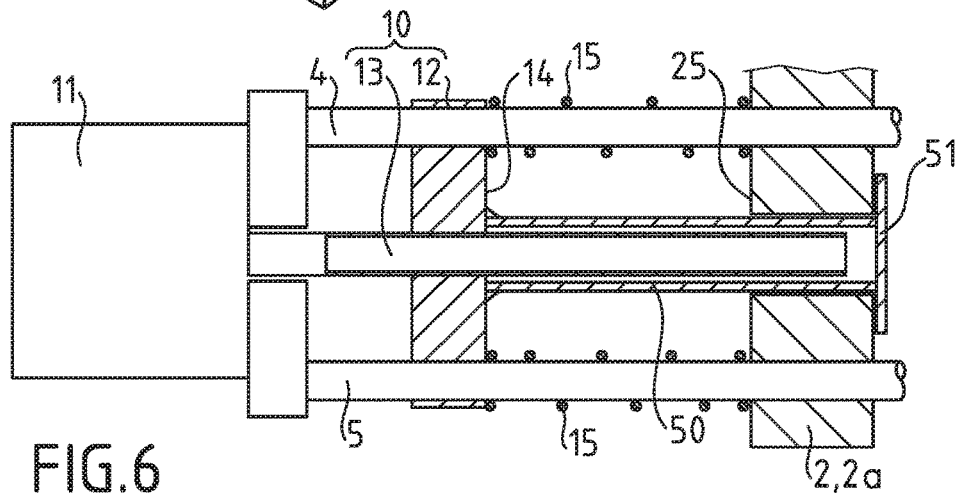

US 10,434,662 B2

GRIPPING DEVICE FOR LINEAR ACTUATION

RELATED APPLICATION

This application claims priority to French Application No. 1750528, filed Jan. 23, 2017, which is incorporated herein by reference to the extent permitted by law.

FIELD OF THE INVENTION

The present invention relates generally to the fields of gripping and manipulating small items, such as Petri dishes, using robotic arms. More particularly, disclosed herein is a gripping device with interconnected, dependent movement of first and second gripping arms and a clamping limitation mechanism for preventing the application of excessive clamping force. The gripping device has application, for example, to robotic arms for incubators or lad ovens designed to observe bacterial growth with non-limiting examples of implementation including laboratories of the agri-food, medical, cosmetic, chemical, and pharmaceutical industries.

BACKGROUND OF THE INVENTION

The prior art has disclosed gripping devices with parallel arms coupled with a drive mechanism that can move the arms into and out of proximity. In one such prior art device, a pinion engages two racks simultaneously, each rack being connected to an arm. A rotating actuation of the pinion, which is coaxially connected to an electric motor, allows the translation of the arms by a translation of a guide.

In bacteriological incubators, a clamp gripping device for a Petri dish can be located on the end of a robotic arm. However, a drawback of applying such a clamp gripper to a robotic arm in an incubator is the cantilevered mass inherent in most devices of the prior art. That mass exerts significant moment at the base of the robotic arm.

With a knowledge of the state of the art, the present inventor has appreciated that it would be advantageous to compensate, whether partially or completely, for the drawbacks of these and further prior art systems. It would be advantageous in particular to provide a clamping or gripping device with parallel arms that enables an efficient and streamlined structure while allowing a seizing and gripping of fragile items of various diameters and, potentially, a monitoring of the clamping or gripping force so applied.

SUMMARY OF THE INVENTION

In view of the foregoing, the present invention is founded on the basic object of providing a gripping device that overcomes the limitations and disadvantages of the prior art.

A more particular object of the invention is to provide a gripping device that is efficient and elegant in construction and operation.

A related object of the invention is to provide a gripping device that reduces structural and operational clutter, particularly vertical clutter, that may otherwise complicate the device, limit or impede functionality, and require excess mass.

Another object of embodiments of the invention is to provide a gripping device that is capable of seizing and gripping even fragile and soft items of different diameters.

It is a further object of gripping devices as disclosed herein to be capable of monitoring and limiting the clamping force applied.

Still another object of embodiments of the invention is to provide a gripping device that is capable of seizing and gripping items with rapidity, including as compared to devices in the same field of endeavor equipped with strain gauges, for example.

Even further, in embodiments of the present invention with a gripping device located at the end of a robotic arm, an object is to limit the mechanical strains in the connections of the robotic arm, including by limiting the mass located at the end of the arm.

One manifestation of the invention can be characterized as a clamp gripping device for a robotic arm. The gripping device is particularly adapted to grip light articles, such as Petri dishes. The gripping device has a support, such as a support case or other support structure, and first and second gripping arms or jaws are retained to translate with respect to the case. A drive system for the gripping arms can, in certain constructions, take the form of a straight-line drive mechanism. That drive system can, in certain embodiments, operate on only one of the gripping arms. The gripping arm so operated can be the first gripping arm, which can be referred to as the operating arm. Actuation of the operating arm can actuate the second gripping arm by operation of an interconnection mechanism. The interconnection mechanism can, for instance, generate a simultaneous actuation of the second gripping arm in a direction opposite that of the operating arm. It is intended that the movement induced by the interconnection mechanism shall not be considered to be operation on the second gripping arm by the drive system with the operation on the second gripping arm instead being carried out by the first gripping arm through the interconnection mechanism.

As taught herein, the operating arm can be moved by a resilient member, such as a compression spring, that receives force from the drive system. The distortion of the resilient member can be measured and that measurement exploited to limit the clamping force applied.

One practice of the gripping device carries forth a plurality of objects of the invention by again being founded on a support, such as a support case. At least one guide member is retained by the support case, and at least two gripping arms are movable with respect to one another and relative to the support case. The arms can be moved along the guide between at least one initial position where the gripping arms are in proximity to one another in a gripping or clamping position and at least one second position where the gripping arms are moved away from one another to be spread to what can be referred to as a slack position. Either or both of the gripping arms can be actuated from the first position to the second position and vice versa by operation of a motorized drive mechanism.

As shown and described herein, the support can be a frame or chassis of the gripping device. Such a frame or chassis is intended to comprise a support or support case as used herein. The support might, for example, be a single piece or the frame of a robotic arm on which the gripping device is fixed.

According to the invention, the drive mechanism comprises an operating member that acts on one gripping arm only with that gripping arm being referred to as the operating arm. The gripping device has a connection mechanism between the two gripping arms. The operating arm acts on the other gripping arm by operation of a connection mechanism. The connection mechanism generates simultaneous movement of the other gripping arm in the opposite direction. The movements of the gripping arms can be expressed, for example, with respect to the support.

The connection mechanism, alternatively referred to as an interconnection mechanism, can be a mechanical connection mechanism. In one such practice of the invention, the interconnection mechanism has at least one cogwheel mounted in a rotatable manner with respect to the support. At least two toothed connection racks are respectively mounted on the gripping arms such that the cogwheel interacts with the two toothed connection racks by meshing. Advantageously, the drive mechanism allows simultaneous and accurate motion of the gripping arms. As taught herein, the cogwheel can be freely mounted on a rotational axis, and the rotational axis can, by way of example, be formed by a stationary rotating shaft. The rotational axis can be fixed with respect to the support. The toothed connection racks can have identical teeth. Additionally or alternatively, the toothed connection racks can engage the same wheel toothing.

The toothed connection racks are, in embodiments of the invention, retained on the gripping arms such that the racks translate in a straight-line manner with respect to one another. Under the gripping device so constructed, linear motion of the operating arm induces a simultaneous and opposite linear motion of the second gripping arm. In the example described, motion of the operating arm leads to motion of the second arm through the coupling provided by the cogwheel and the toothed connection racks. Each toothed connection rack is fixed relative to one of the gripping arms and interacts with the cogwheel by meshing. With that, the toothed connection racks move in opposite directions during rotation of the cogwheel. The connection mechanism allows symmetrical motion of the two gripping arms with regard to the cogwheel.

In another embodiment of the invention, the cogwheel and the toothed connection racks are replaced. An interconnection mechanism is disclosed that comprises a lever mounted in a rotatable manner with respect to the support. The lever pivots around an axis of rotation perpendicular to the plane of motion of the gripping arms. The axis of rotation can be located perceptibly in the center of the lever. The lever can comprise oblong slots on both sides of the axis of rotation. At least two guide pins or slugs are respectively fixed on the gripping arms so that each guide pin is inserted in an oblong slot of the lever. The guide pins or slugs interact with the lever by a camming action to create a connection between the rotation of the lever and a symmetrical translation of the arms.

The lever preferably has a straight-lined shape. However, it can also be otherwise shaped, such as N-shaped or Z-shaped. Preferably, the oblong slots are straight-lined, but they could be curved or otherwise shaped. Their lengths can be determined under the trajectory of each gripping arm so that each guide pin can slide into an oblong slot when the gripping arms translate from clamping position to slack position and conversely.

According to another embodiment of the interconnection mechanism, again with the cogwheel and the toothed connection racks being replaced, an interconnection mechanism is exploited wherein at least two pulleys are mounted on the support case so that they rotate freely. At least two guide pins or slugs are respectively fixed on the gripping arms. A belt is disposed so that it cooperates with the pulleys in such a manner that it forms two parallel strands that move in opposite directions on rotation of the pulleys. A guide pin is fixed to travel with each strand. The pulleys have a rotating axis that is preferably located outside of a zone between the two arms when the arms are spread out in a slack position. Each guide pin is connected to the belt by a flange, such as but not limited to a pin.

In each case, the interconnection mechanism induces coupled, interdependent movement, such as synchronized movement, of the gripping arms. The interdependent, potentially synchronized, movement of the gripping arms can be such that the gripping arms undergo interdependent movement in opposite directions and at equal distances.

According to practices of the invention, the gripping device can comprise at least one guide arranged to perform a translational guidance of the gripping arms with respect to the support and along the at least one guide. For instance, the at least one guide can be unitary with the support.

The drive mechanism can comprise an operating member that performs straight-line actuation of the operating arm to translate it along the at least one guide as the gripping arms move from a slack position to a clamping position, or inversely, by a straight-line translation.

The operating member can, for example, be located on a robotic arm and, further, can be arranged in a direction parallel to the longitudinal orientation of the arm. The operating member actuates the operating arm in a direction that is parallel to the translation. The operating arm actuates itself on the opposite gripping arm by means of the interconnection mechanism. This feature allows the distribution of the mass of the drive mechanism along the robotic arm.

Preferably, the operating member comprises a screw-nut mechanism formed by interaction of a first component and a second component, in which the first component is fixed against rotation by at least on guide and the second component is driven into rotation by a motor so that it leads to the translation of the first component along at least one guide. The first component slides on or around at least one guide. The first component is connected to the operating arm to trigger its motion in a straight-lined translation. The screw-nut mechanism has the advantage of being compact and easily connectable to a rotary motor.

The motor is arranged and patterned to set in motion the drive mechanism. Preferably, the motor is a stepper motor. Preferably, the motor is mounted inside the robotic arm, for instance on one end of the arm that is opposite to the end of the arm that bears the gripping device.

According to an embodiment, the guide comprises one or several guide rods fixed to the support case and on which slides the first component of the operating member, or conversely. One or several guide rods are arranged in order to perform a translational guidance of the gripping arms. Preferably, the rods are arranged in a parallel manner with respect to each other. For instance, the guide rods can be fixed on the support case. According to another embodiment, the rods can form the frame of a robotic arm.

The guide rods are arranged to perform a translational guidance of the gripping arms with respect to the support case and along the guide rods. For instance, the guide rod or rods is or are cylindrical. At least one guide rod crosses the gripping arms so that they slide in a straight-lined manner on at least one guide rod. The guide rods operate both to hold the gripping arms and to guide their translational guidance.

The first component of the operating member slides on one or several guide rods.

According to another embodiment, the first component of the operating member is fixed to one or several guide rods, and the combination so formed slides with respect to the support.

In reference, for example, to the first embodiment of the interconnection mechanism described hereinbefore, the racks can be arranged in parallel to at least one guide rod.

Preferably, the first component of the screw-nut mechanism comprises a nut which slides on the guide and whose translation sets in motion the operating arm. In case the guide is embodied by one or several guide rods, the nut slides on the rods, for instance. The second component of the screw-nut mechanism comprises an operation screw. Optionally, the operation screw is located between the guide rods and is parallel to them. This set up has the advantage to form a compact device.

Optionally, the gripping device incorporates a clamping force limitation system. According to one embodiment, the operating member moves the operating arm through the clamping force limitation system. The operating member can be a nut driven by a screw.

The clamping force limitation system operates by measuring the transmitted effort that is exerted by the operating arm to limit the motion of the operating arm toward the clamping position and to avoid overtightening the gripping arms in relation to the item seized and gripped. The clamping force limitation system is operative to measure the exerted effort of the operating arm. The measurement of the exerted effort can, for example, be measured by measuring a distortion, such as a linear distortion, resulting from the effort exerted by the operating arm and transmitted within the clamping force limitation system. The clamping force limitation system limits or prevents the item seized and gripped by the gripping device from being deteriorated during clamping, such as being broken, deformed, or marred.

In embodiments of the gripping device, the clamping force limitation system includes a resilient member, such as a spring, that deforms under the clamping force applied on the seized item. The measurement of the effort exerted can then be obtained by measuring the deformation of the spring. The spring could, for example, be a compression of the spring with the stiffness constant of the spring being already known. In particular practices of the invention, the spring is arranged concentrically on a guide rod. For example, the spring can be arranged concentrically on a guide rod and around it. This set up has the advantage of contributing to the creation of a compact device. The clamping force limitation system can comprise one or several springs configured in such a manner that each spring is arranged concentrically on a guide rod.

As taught herein, the spring or springs can be arranged so that it bears on a bearing surface of the operating member and on an operating surface of the operating arm in such a manner that, when the operating member translates to move the operating arm toward the clamping position, the spring compresses once the operating arm makes contact with the seized item. The bearing surface of the operating member is oriented toward the operating arm. The operating surface of the operating arm is oriented toward the first component of the operating member, such as toward the nut. There can, for example, be one spring around each guide rod.

While in a slack position, the gripping arms are typically not in contact with the item to be seized and gripped. The clamping force limitation system would then be inactive so that the distance between the first component and the operating arm is substantially constant.

Each embodiment of the gripping device can include a clamping sensor that detects or measures the distortion of the clamping force limitation system to provide an assessment of the clamping force exerted on the seized item. By way of example and not limitation, the sensor can be an optical sensor. The sensor could, without limitation except as may be provided in the claims, be fixed on a piece located on the first component or on the operating arm. In one embodiment, the sensor detects the presence, or the absence, of a detectable member, such as a metal tongue or a finger. The detectable member can be fixed on the other piece among the first component and the operating arm as compared to the sensor. Such embodiments can be manufactured and operated in a simple and efficient manner. The sensor and the detectable member come closer to each other when the spring is compressed. An adjustment of the clamping force threshold is possible by, for instance, adjusting in translation the position of the sensor and/or the detectable member. In addition to being simple and efficient in structure and operation, such embodiments allow an accurate adjustment of the clamping force of the gripping arms.

The clamping sensor can be an optical sensor mounted on the first component. The optical sensor can interact with at least one marker attached to the operating arm that extends toward the first component. The sensor can then determine the position of the marker or markers. Based on the sensing of the position of the marker, the compression of the at least one spring can be determined. The marker or markers can be graduated. The optical sensor can be a fork sensor with a transmitter and a receiver. A metal tongue forming the detectable member can be arranged and configured so that it moves between the transmitter and the receiver of the sensor when the at least one spring is being compressed.

Optionally, the gripping device can include a drag link to drag the operating arm into the slack position. For instance, the drag link crosses the operating arm and has a shoulder that, when actuated toward the slack position, bears on a surface of the operating arm that faces the other gripping arm to move the operating arm toward the slack position. The second gripping arm can be moved by the interconnection mechanism. The drag link can, for example, be attached on a nut of a screw-nut mechanism of the operating member. The drag link allows the gripping device to return to the slack position easily and quickly. The drag link could, by way of example, comprise a cylindrical rod.

According to another aspect of the invention, a robotic arm is proposed that employs a gripping device that incorporates one or more of the previous features.

According to another aspect of the invention, a bacteriological incubator is proposed that incorporates a gripping device that complies with one or more of the previous features.

In still another aspect, a robotic arm with one or more aspects as disclosed herein and adapted to seize bacteriological culture containers is proposed.

The foregoing discussion broadly outlines certain goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

Additional features and benefits of the invention will be appreciated in view of the following detailed description and drawing figures of implementations and embodiments of the gripping device wherein:

FIG. 4 is a bottom plan view of the gripping device in a clamping position;

FIG. 5 is a schematic, perspective view of a cogwheel-and-racks interconnection mechanism between two gripping arms of an embodiment of the gripping device providing simultaneously motion of the gripping arms with the gripping arms in the slack position of FIG. 2;

FIG. 6 is a schematic, cross-sectional view of an embodiment of the gripping device taken along a longitudinal cross section through the axis of rotation of one operating member depicting a drag link on one gripping arm;

DETAILED DESCRIPTION OF PREFERRED EMBODIMENTS

The gripping device disclosed herein is subject to a wide variety of embodiments. However, to ensure that one skilled in the art will fully understand and, in appropriate cases, be able to practice the present invention, certain preferred embodiments of the broader invention revealed herein are described below and shown in the accompanying drawings. These embodiments are illustrative and without limitation of the scope of the invention. In view of the present disclosure, variants of the invention may become apparent. Certain variants may include only a selection only of certain disclosed features, each such feature offering a technical benefit or differentiating the invention from the state of the art. Certain selected features may be, or may be interpreted to be, functional without structural limitation or with only such structural limitation as may be sufficient to provide a technical advantage or to differentiate the invention with regard to the prior art. Certain variants and embodiments disclosed herein may be exploited independently or in combination. The protection of the invention shall be limited only by the express terms of the claims.

Figure 1:
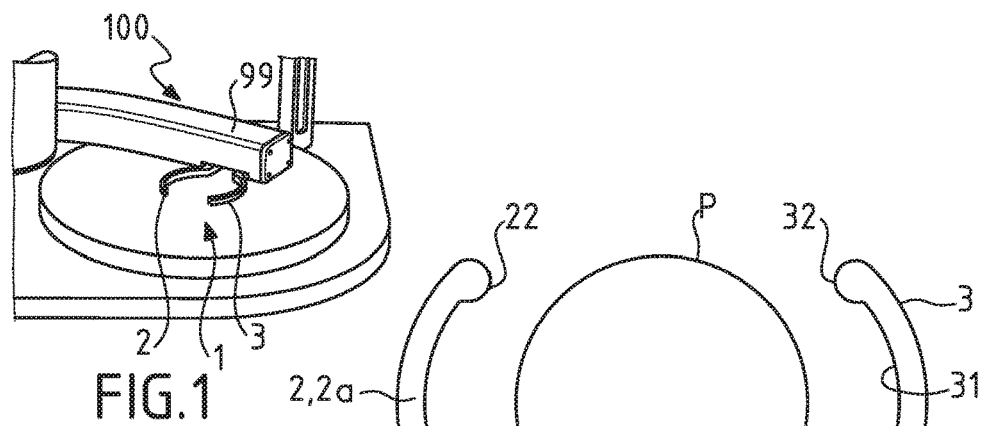
FIG. 1 is a perspective view of a robotic arm with a gripping device according to the invention.

Looking more particularly to FIG. 1, a robotic arm 100 is shown. The robotic arm 100 is arranged and configured to move horizontally, vertically, or both horizontally and vertically by mechanisms or actuators that would be known to a person skilled in the art. The robotic arm 100 retains a gripping device, which is indicated generally at 1, retained at a distal end of the arm 100. In this example, the gripping device 1 is a clamp gripping device 1.

Here, the gripping device comprises first and second gripping arms 2 and 3. The first gripping arm 2 and the second gripping arm 3 are arranged and configured to move or more particularly to translate toward and away from one another. As disclosed herein, one of the gripping arms 2 or 3 is movable by translation with respect to the other gripping arm 2 or 3 and in relation to a support 99, which may alternatively be referred to as a support case 99.

Figure 2:
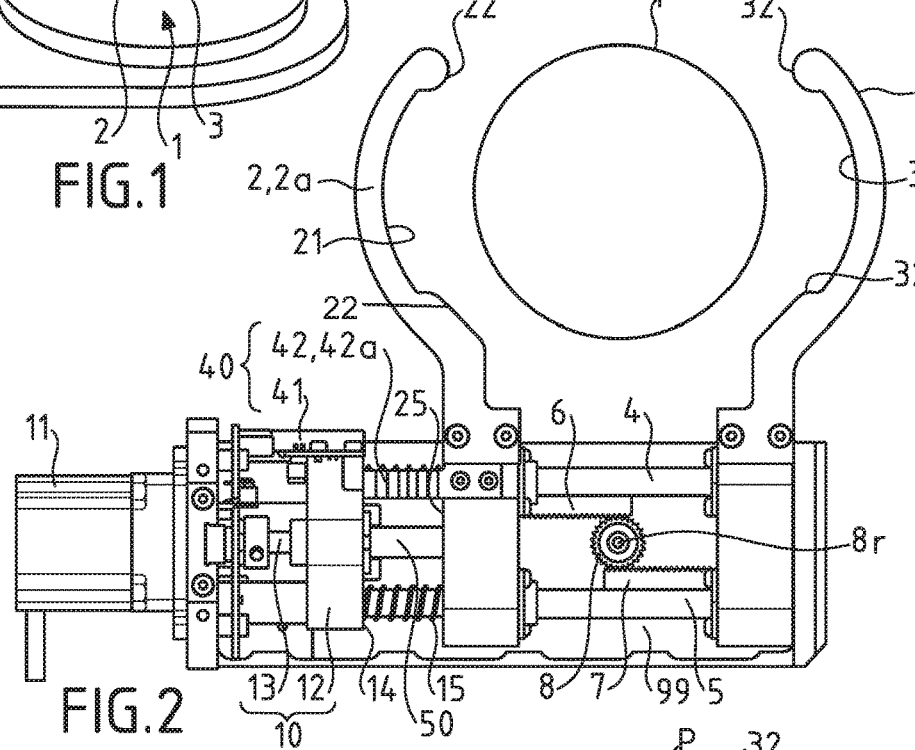
FIG. 2 is a bottom plan view of the gripping device in a slack position.

The movable gripping arm 2 or 3 is capable of translating from at least one first position where the gripping arms 2 and 3 are close to each other in proximity to at least a second position where the gripping arms 2 and 3 are spread out and moved out of the proximity of the first position and, conversely, from the second position where the gripping arms 2 and 3 are spread apart and relatively out of proximity to the first position where the gripping arms 2 and 3 are moved into proximity relative to the second position. The first position, which is illustrated in FIG. 4 for instance, may be referred to as the clamping position. The second position, which is illustrated in FIG. 2 for instance, may be referred to as the slack position.

With further reference to FIGS. 2 through 5, the gripping arms 2 and 3 can be considered to extend perpendicularly in relation to their direction of relative, translating motion. The gripping arms 2 and 3 in the depicted example are substantially symmetrical in shape with respect to a line perpendicular to the direction of translation.

As shown in FIGS. 1 through 4, each gripping arm 2 and 3 has a gripping face 21, 31. The gripping faces 21 and 31 are shaped as semicircular arcs or otherwise have a concave pattern designed to come into contact with an item to seize and grip P. The semicircular arc shape of the gripping faces 21 and 31 enables them to seize convex or cylindrical items more easily. The gripping face 21 of the first arm 2 faces toward the gripping face 31 of the second arm 3.

Preferably, each gripping face 21 and 31 has one or more prominences, blisterings, or protuberating portions. In reference to FIGS. 2 through 4, for example, the gripping face 21 offers two protuberating portions 22 and the gripping face 31 offers two protuberating portions 32. The protuberating portions 22 and 32 are symmetrically disposed on the gripping arms 2 and 3 with a proximal protuberating portion 22 or 32 on each gripping arm 2 and 3, a distal protuberating portion 22 or 32 on each gripping arm 2 and 3, and a non-protuberating portion interposed between the respective protuberating portions 22 and 32. On each gripping arm 2 and 3, the protuberating portions 22 and 32 are positioned and spread out from one another along the gripping face 21 and 31 at such a distance that the item P seized by the gripping arms 2 and 3 tends to make contact with the protuberating portions 22 and 32 instead of with the inner, non-protuberating portion of the gripping faces 21 and 31.

The protuberating portions 22 and 32 tend to induce a centering of the item P seized between the gripping arms 2 and 3 when the gripping arms 2 and 3 move into proximity to seize and grip the item P. For instance, where each gripping arm 2 and 3 has a gripping face 21 or 31 with two protuberating portions 22 and 32, four points or areas of contact are established, two to each side of the item P, when the gripping arms 2 and 3 move to make contact with the item P. The item P tends to be automatically centered between the protuberating portions 22 and 32 and the gripping arms 2 and 3 in general.

Looking again to FIGS. 2 through 4, the gripping device 1 has two guide rods 3 and 5. The guide rods 4 and 5 slidably guide the gripping arms 2 and 3 with respect to the support 99 and along the guide rods 4 and 5. In this example, the support 99 may alternatively be referred to as a support case or case 99. The guide rods 4 and 5 are retained in a parallel disposition and are mounted on the case 99. The guide rods 4 and 5 in this embodiment are cylindrical and traverse through proximal base portions of the gripping arms 2 and 3.

A drive mechanism of the gripping device 1 drives the gripping arms 2 and 3, one with respect to the other, from the first position to the second position and vice-versa in both directions. In certain embodiments, one of the gripping arms 2 or 3, in this case the first gripping arm 2, can be alternatively referred to as an operating arm 2a. The depicted drive mechanism includes a connection mechanism, which may alternatively be referred to as an interconnection mechanism. In reference to FIGS. 2 and 5, for example, the interconnection mechanism there comprises a cogwheel 8 that is rotatably retained with respect to the support case 99 to turn about a fixed rotation axis 8r. More particularly, the cogwheel 8 is retained to rotate by a shaft 8r mounted on the case 99.

The rotation axis 8r is disposed between the gripping arms 2 and 3. The interconnection mechanism in the current embodiment comprises two connection toothed racks 6 and 7 comprising a first rack 6 mounted to the first gripping arm 2 and a second rack 7 mounted to the second gripping arm 3. The racks 6 and 7 are parallel to each other and interact with the cogwheel 8 by meshing teeth. While the proximal base portions of the gripping arms 2 and 3 slide along the guide rods 4 and 5, the racks 6 and 7 move in opposite directions during a rotation of the cogwheel 8. In FIG. 5, the interconnection mechanism is depicted as it would be positioned with the gripping arms 2 and 3 in the second, slack position as in FIG. 2.

In reference to FIG. 2, the racks 6 and 7 can be perceived to be arranged in parallel to the guide rods 4 and 5. The interconnection mechanism formed with the cogwheel 8 and the racks 6 and 7 provides a synchronized interconnection of the motion of the two gripping arms 2 and 3. The movement of the gripping arms 2 and 3 is symmetrical with regard to the support case 99. Preferably, the length of each rack 6 and 7 is noticeably equal or slightly superior to the distance covered by a gripping arm 2 and 3 from the slack position of FIG. 2 to the clamping position of FIG. 4. In certain, non-limiting embodiments, each rack 6 and 7 measures between 5 and 10 centimeters long.

Accordingly, pursuant to the embodiment of the connection mechanism shown in FIG. 5, the first rack 6, which is fixed to the operating arm 2a, drives and transfers the actuation to the second rack 7, which is fixed to the second arm 3. The second arm 3 is thus concomitantly driven toward clamping position or toward slack position by operation of the cogwheel 8.

Figure 3:
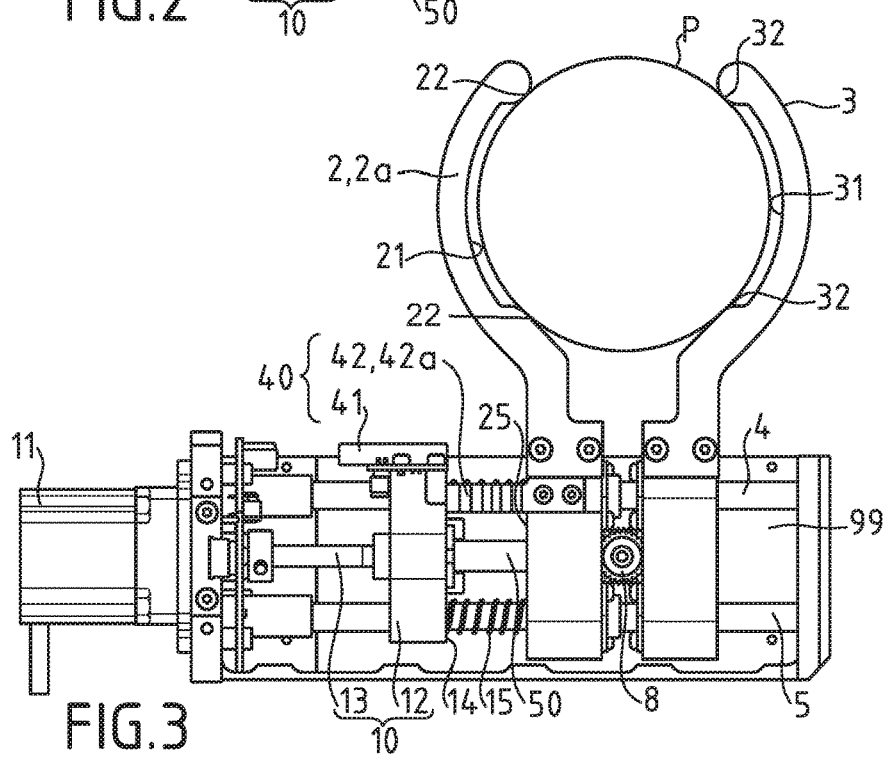
FIG. 3 is a bottom plan view of the gripping device in a gripping position retaining a seized item.

Referencing FIGS. 2 through 4, the drive mechanism of the gripping device 1 includes an actuating mechanism that actuates movement of the first gripping arm 2, which may then be referred to as the operating gripping arm 2a. Movement of the operating gripping arm 2a induces movement of the second gripping arm 3 through the interconnection mechanism. In the current embodiment, the actuating mechanism comprises a screw-nut mechanism 10. The screw-nut mechanism 10 is connected to both a motor 11 and the first arm 2 as the operating arm 2a. The screw-nut mechanism 10 and the motor 11 actuate the movement of the operating gripping arm 2 and, through the interconnection mechanism of the drive mechanism, the second gripping arm 3.

The screw-nut mechanism comprises a threaded member 12, which may be referred to as a nut 12. An operation screw 13 is threadedly engaged with the nut 12. As used herein, the term nut shall require only a member with a threaded hole for engaging the operation screw 13 and shall not require any particular size or shape. The nut 12 is fixed against rotation, such as by being connected in a sliding engagement with the two guide rods 4 and 5. The sliding connection to the two guide rods 4 and 5 also limits the risk that the nut 12 will jam or lock on a given guide rod 4 or 5 as might happen with connection to one guide rod 4 or 5 only. The nut 12 is connected to the operating arm 2a as further shown and described herein.

The operation screw 13 of the screw-nut mechanism 10 works together with the nut 12. The screw 13 is selectively rotated by the motor 11 so that rotation of the operation screw 13 induces straight-line translation of the nut 12 along the guide rods 4 and 5. The operation screw 13 in the depicted embodiment extends in a direction parallel to the guide rods 4 and 5. The thread of the screw 13 is longer that a movement length of the operating arm 2a from the slack position to the clamping position. With that, the first arm 2 acting as the operating arm 2a and the second arm 3 are capable of seizing, gripping, and clamping the item P as described hereinbelow. As a non-limiting illustrative example, the operation screw 13 can have a thread length of between 5 and 15 centimeters.

When the gripping device 1 is actuated, either to move toward the slack position or toward the gripping position, rotation of the screw 13 produces longitudinal movement of the nut 12. Longitudinal movement of the nut 12 causes movement of the operating arm 2a. By operation of the interconnection mechanism of the drive mechanism, the movement of the operating arm 2a causes the synchronous, opposite movement of the second gripping arm 3.

Figure 7:
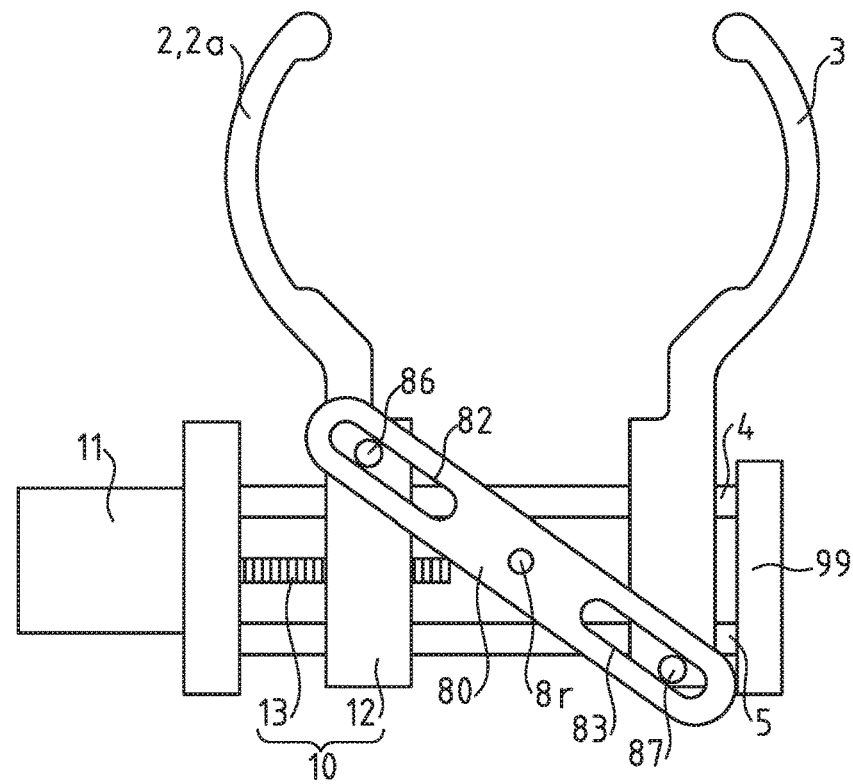
FIG. 7 is a bottom plan view of a gripping device according to the invention schematically illustrated and shown for clarity of illustration without a clamping system or sensor with an alternative interconnection mechanism comprising a cam effect transmission.

Looking to FIG. 7, an alternative embodiment of the interconnection mechanism is depicted. The mechanism comprises a lever 80 mounted movably and in a rotatable manner to pivot around a fixed axis of rotation 8r with respect to the support case 99. The axis of rotation 8r is located between the gripping arms 2 and 3. The lever 80 has the shape of a straight bar with a borehole centered along the length of the lever 80 designed to receive the axis of rotation 8r. The lever 80 has longitudinally disposed oblong holes or slots 82 and 83. The slots 82 and 83 have first ends adjacent to the respective end of the lever 80 and second ends proximal to the axis of rotation 8r.

The interconnection mechanism of FIG. 7 further includes two guide pins 86 and 87. A first guide pin 86 is fixed on the first gripping arm 2, and a second guide pin 87 is fixed on the second gripping arm 3. The guide pin 86 matches with the oblong slot 82, and the guide pin 87 matches with the oblong slot 83. Each guide pin 86 and 87 interact as by sliding along the longitudinal edges of the respective oblong slot 82 or 83 in the lever 80. When the gripping device 1 is actuated toward the clamping position, the lever 80 in the depicted example rotates clockwise and each guide pin 86 and 87 slides along the respective oblong slot 82 or 83 toward the axis of rotation 8r. The gripping arms 2 and 3 are brought closer together. Conversely, when the gripping device 1 is actuated from the gripping condition where the gripping arms 2 and 3 are in relative proximity toward the slack condition where the gripping arms 2 and 3 are moved relatively away from one another, the lever 80 in the depicted example rotates counter-clockwise and each guide pin 86 and 87 slides along the respective oblong slot 82 or 83 away from the axis of rotation 8r.

While the slots 82 and 83 are depicted as being entirely through the lever 80 and with closed ends in this embodiment, it will be understood that other constructions are possible. Without limitation, the slots 82 and 83 could have open ends so that the lever 80 essentially forms forks that frame the guide pins 86 and 87 and act as channels along with the guide pins 86 and 87 travel.

Therefore, according to the alternative embodiment of the interconnection mechanism illustrated in FIG. 7, when the operating gripping arm 2a is moved in translation, such as by a screw-nut combination 10, the first guide pin 86 of the operating arm 2a will drive and transfer the actuation to the second guide pin 87 of the gripping arm 3 so that the second gripping arm 3 is simultaneously and dependently driven toward the clamping position or toward the slack position by the lever 80. When actuating toward the clamping position, the first guide pin 86 pushes the lever 80 as the first guide pin 86 slides along the radially communicating surface of the oblong slot 82 of the lever 80. Simultaneously, the lever 80 moves the second gripping arm 3 in a translating movement aligned with the longitudinals of the guide rods 4 and 5 as the guide pin 87 slides along the radially communicating slot 83 of the lever 80. With that, the second gripping arm 3 is effectively pushed or pulled as the second guide pin 87 is pushed or dragged by the slot 83 of the lever 80. The lever 80 is in turn driven by the sliding movement of the first guide pin 86 as the guide pin 86 moves with the proximal base portion of the operating arm 2a as the operating arm 2a is itself driven, such as by the screw-nut mechanism 10.

Figure 8:
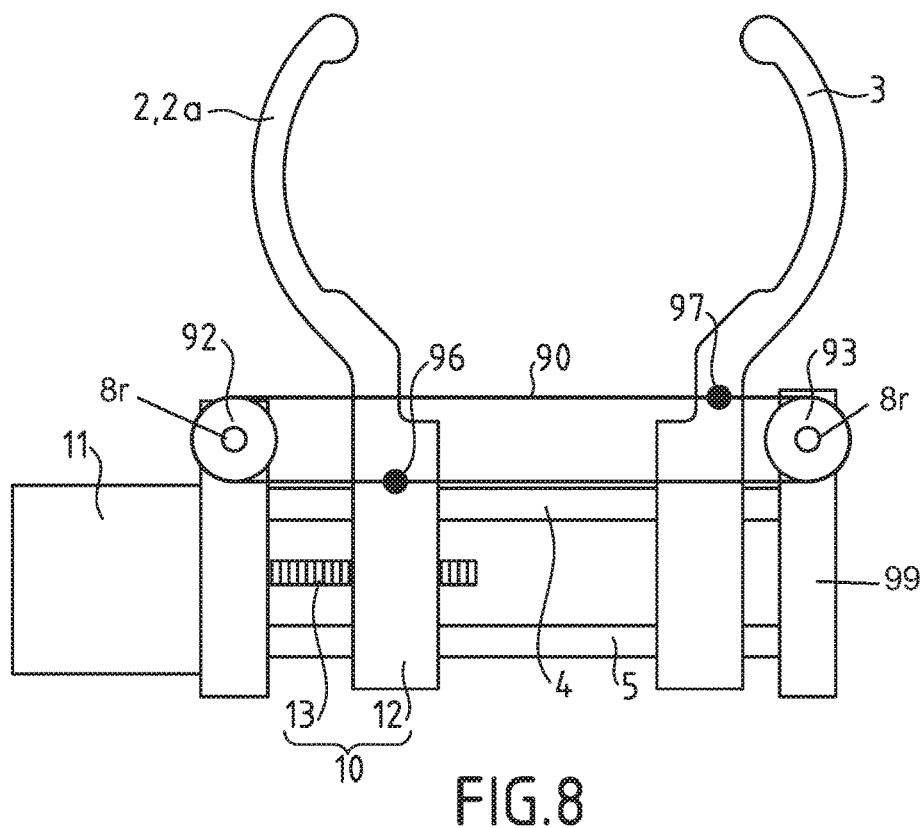
FIG. 8 is a bottom plan view of another gripping device according to the invention again schematically illustrated and shown for clarity of illustration without a clamping system or sensor with a further alternative interconnection mechanism comprising a pulley and belt transmission.

With reference to FIG. 8, a second alternative embodiment of the interconnection mechanism is shown. The interconnection mechanism has first and second pulleys 92 and 93 rotatably mounted to turn about an axis of rotation 8r that is fixed with respect to the support case 99. The pulleys 92 and 93 are mounted outside of the zone existing in between the proximal base portions of the gripping arms 2 and 3 while the gripping arms 2 and 3 are in the slack position. The first pulley 92 is arranged at a distance from the gripping arm 2, and the second pulley 93 is arranged at distance or remotely from the gripping arm 3. The distance between the outer surface of each gripping arm 2 or 3 and the periphery of the respective pulley 92 or 93 can, by way of example and not limitation, be from about a few millimeters to several centimeters, 5 centimeters for instance.

With further reference to FIG. 8, the second pulley 93 in this exemplary embodiment is rotataby retained adjacent to the distal end of the support 99. The second pulley 93 is thus disposed distal to or beyond the first and second gripping arms 2 and 3 and adjacent to the distal ends of the guide rods 4 and 5. The first pulley 92 is rotatably retained relative to the support case 99 proximal to the first gripping arm 2 and adjacent to an end of a motor 11. The interconnection mechanism has a first guide pin 96 fixed on the first gripping arm 2 and a second guide pin 97 fixed on the second gripping arm 3. The interconnection mechanism additionally comprises a tensioned belt 90 that loops around the pulleys 92 and 93 in such manner that it forms first and second strands spanning tangentially from the first pulley 92 to the second pulley 93.

The first strand of the belt 90 is fixed to the first guide pin 96, and the second strand of the belt 90 is fixed to the second guide pin 97. With the guide pins 96 and 97 fixed to opposite strands, a rotation of the pulleys 92 and 93 will induce a movement of the strands of the belt 90 and thus of the first and second guide pins 96 and 97 in opposite directions. The placement of the pulleys 92 and 93 at a distance outside of the proximal base portions of the gripping arms 2 and 3 allows the strands of the belt 90 to align with any position of the gripping arms 2 and 3 as the guide pins 96 and 97 travel in alignment with longitudinals of the guide rods 4 and 5.

Rotation of the pulleys 92 and 93, advancing of the belt 90 in either direction, movement of the guide pins 96 and 97, and resulting translating movement of either or both gripping arms 2 and 3 is carried forth by the drive mechanism. Here, the drive mechanism is carried forth by a screw-nut mechanism 10 that moves the operating arm 2a, which comprises the first gripping arm 2, using a screw-nut mechanism 10. A motor 11 actuates the drive mechanism, such as by rotating the screw 13 as further described herein.

Therefore, according to the alternative embodiment of the interconnection mechanism illustrated in FIG. 8, the first guide pin 96 of the operating arm 2a drives and transfers the actuation to the second guide pin 97 of the gripping arm 3, which is driven toward the clamping position or toward the slack position by the pulleys 92 and 93 and of the belt 90. When moving toward the clamping position, the first guide pin 96 drags the belt 90, and the belt 90 transmits that translation movement into a counter-clockwise rotation movement by operation of the pulleys 92 and 93. Simultaneously, the belt 90 drags the second guide pin 97 that is fixed to the second arm 3. With that, both gripping arms 2, 2a and 3 move into proximity, such as to seize and grip an item P.

In other embodiments, the drive mechanism is carried forth by the motor 11 driving the belt 90. For instance, the motor 11 can directly induce a rotation of the first pulley 92.

According to embodiments of the gripping device, the motor 11 can, for instance, be an electric motor. The motor 11 could be an electric step motor. In the depicted examples, the motor 11 is fixed to the support case 99.

As taught herein the gripping device 1 incorporates a clamping limitation mechanism 15 that is arranged and configured to avoid excessive clamping of the item P seized by the gripping arms 2 and 3. The clamping limitation mechanism 15 operates by measuring the effort exerted by the gripping arms 2 and 3 and, based on that measured effort, limiting the movement of the operating arm 2a toward the clamping position. For instance, the clamping limitation mechanism 15 in one embodiment operates by measuring the linear distortion created by the effort exerted to cease clamping, more particularly to cease further clamping movement, when the clamping force threshold is reached.

In reference to FIGS. 2, 3, 4, and 6, the clamping limitation mechanism 15 has at least a portion thereof interposed between the nut 12 and the operating arm 2a. Movement of the nut 12 moves the operating arm 2a through the clamping limitation mechanism 15. In this example, the clamping limitation mechanism 15 applies force to the operating arm 2a, such as by pressing against the operating arm 2a, and the nut 12 applies force to the clamping limitation mechanism 15, such as by pressing against the clamping limitation mechanism 15. The effort or force transmitted to the clamping limitation mechanism 15 matches the force provided by the nut 12 due to the interruption of the motion of the gripping arms 2 and 3 when they make contact with the item P to seize and grip.

The clamping limitation mechanism 15 in this example is founded on two resiliently compressible members, which in the depicted embodiment comprise springs 15. The springs 15 distort under the clamping force effect applied to the item P seized and gripped. The springs 15 are helical springs. Each spring 15 is mounted to receive a guide rod 4 or 5 in a concentric manner with the first guide rod 4 being received within a first spring 15 and the second guide rod 5 being received within a second spring 15. This construction has the advantage of being compact. Each spring 15 contacts a bearing surface 14 of the nut 12 and an operating surface 25 of the operating arm 2a. Therefore, when the nut 12 translates to move the operating arm 2a toward the clamping position, the springs 15 tend to be compressed once the operating arm 2a or the both the operating gripping arm 2a and the gripping arm 3 make contact with the item.

The gripping device 1 further includes a sensor or sensor combination 40 that operates to detect and measure the distortion of the springs 15 to provide an assessment of the clamping force exerted on the seized item P as the springs 15 are compressed by a movement of the faces 14 and 25 into proximity. For instance, the sensor 40 can include an optical sensor 41. The sensor 40 is mounted on the nut 12 to detect a detectable member 42, such as a finger or metal tongue 42. The detectable member 42 can be fixed on the operating arm 2a. The sensor 40 could, for instance, detect the location, position, presence, or absence of the detectable member 42. The sensor 40 can, for example, detect the detectable member 42 coming closer to the sensor 41 as the compressible members 15 are compressed and the faces 14 and 25 move into proximity.

As shown, for example, in FIGS. 2 through 4, the detectable member 42 in this embodiment extends in parallel to the guide rod 4 from its fixed position on the operating arm 2a toward the nut 12. The detectable member 42 has one or several marker(s) on at least one face thereof. The sensor 41 is positioned with respect to the detectable manner 42 so that the marker(s) on the detectable member 42 scroll(s) before the sensor 41 and are detected by it. With that, the sensor 41 can detect the relative position of the detectable member 42. Based on that detection, the sensor 41 can determine the relative position of the nut 12 with respect to the operating arm 2a and, further, the compression of the springs 15 based on a sensed change in distance between the face 14 of the nut 12 and the face 25 of the operating arm 2a.

The detectable member 42 can have a length that extends from the operating arm 2a equal to the length of the springs 15 at rest. This feature allows the detection of a wide range of compressions and in particular of low compression forces, which is advantageous when controlling the clamping force on a soft, elastic, or highly fragile item. Such a construction can, for example, be operative to detect a clamping force comprised between 0.1 and 5 N. Preferably, the optical sensor 41 is of the fork type with a sensor transmitter and a sensor receiver. The detectable member 42 is then arranged and configured so that it moves from the sensor transmitter and the sensor receiver during the compression of the springs 15. Optionally, although not shown, the nut 12 can have a bore so that the tongue 42 is able to introduce itself in the nut 12 when the springs 15 are compressed.

According to the invention, a clamping force threshold setting can be obtained by adjusting the position of the sensor 41 and, additionally or alternatively, the detectable member 42 in a translation movement. Actuation of the clamping device 1 can be interrupted, such as electronically or otherwise, when a predetermined compression of the spring 15 is detected based on a detection of a predetermined position of the detectable member 42 in relation to the sensor 31. For example, when the sensor 41 detects on the detectable member 42 a position that matches a predetermined compression of the spring 15 and thus a predetermined compressive force on the spring 15 and a corresponding predetermined gripping force on the item P, the actuation of the gripping device 1 can automatically be interrupted, electronically for instance, so that further gripping force is not applied. This construction allows an adjustment of the maximum clamping or gripping force applied to the item P by an adjustment of the position of the detectable member 42 in relation to the sensor 41 that triggers an automatic cessation of the application of additional gripping force.

The gripping device 1 further includes an arresting rod 50 that drags the operating arm 2a toward the slack position. As shown in FIGS. 4 and 6, for example, the arresting rod 50 comes across the operating arm 2a and has a flange 51. The flange 51 can act on a face of the operating arm 2a in a facing arrangement with the second arm 3 to move the operating arm 2a toward the slack position when the nut 12 is actuated toward slacking. As FIG. 6 shows most clearly, the arresting rod 50 is mounted on the nut 12 and is composed of a tube concentrically arranged on and around the operation screw 13. This feature has the advantages to result in a compact device, to move the operation arm 2a into slack position quicker than the springs 15 themselves would be able to do when moving toward contact position, and also to reach a slack position more distant and beyond the range of force applied by the springs 15.

In practice, operation of the gripping device 1 can begin with the gripping arms 2 and 3 in a slack position as in FIG. 1 where there is not item between the gripping arms 2 and 3. The gripping arms 2 and 3 are spread from one another, ready to seize and grip an item. Then, the gripping device 1 can be moved by the robotic arm 100 so that the gripping arms 2 and 3 are disposed astride the item P to seize as in FIG. 2.

With the gripping arms 2 and 3 so disposed, the gripping device 1 is ordered to bring the gripping arms 2 and 3 into proximity to seize the item P. The motor 11 rotates the operation screw 13 of the screw-nut mechanism, leading to the translation of the nut 12 along the operation screw 13 and along the guide rods 4 and 5. By the force of the springs 15, the nut 12 pushes the operating arm 2a. The lengths of the springs 15 tend to remain consistent during the translation until the two gripping arms 2 and 3 make contact with the item P to seize. During the translation, there is no distortion of the springs 15 until the instant after the first and second gripping arms 2 and 3 make contact with the item P as shown in FIG. 3.

Looking again to FIG. 4, once the gripping arms 2 and 3 and the item P make contact, the gripping arms 2 and 3 come closer to each other a minimal distance until the clamping position is reached. In one practice of the invention, by way of an illustrative example, the gripping arms 2 and 3 come closer by a few millimeters, each arm 2 and 3 moving toward the item P at a distance equal to 3 to 10 millimeters, for instance. To do so, the operation screw 13 is rotated so that the nut 12 compresses the springs 15 with the springs 15 being compressed between the nut 12 and the operating arm 2a. The gripping arms 2 and 4 exert a clamping force on the seized item P that is proportional to the springs restoring force. For instance, with Petri dishes that are fragile and subject to distortion, a 2 Newton clamping force is required for sufficient gripping, but the clamping force must not be significantly greater than that force to prevent damage, distortion, or marring. When the sensor 41 detects on the detectable member 42 a position that matches a predetermined compression of the spring 15 and thus a predetermined maximum compressive force on the spring 15 and a corresponding predetermined maximum gripping force on the item P, the actuation of the gripping device 1 is automatically interrupted, such as electronically, so that additional gripping force is not applied. Pursuant to the invention, the gripping force applied to the item P can be determined by a sensing of the position of the detectable member 42, and the maximum gripping force applied by the gripping arms 2 and 3 on the item P can be adjusted by an adjustment of the position of the detectable member 42 in relation to the sensor 41 that triggers an automatic cessation of the application of additional gripping force.

With certain details of the present invention for a gripping device 1 disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express, or be interpreted to express, certain elements as means for performing a specific function, at times without the recital of structure or material. As the law demands, these claims shall be construed to cover not only the corresponding structure and material expressly described in this specification but also all equivalents thereof that might be now known or hereafter discovered.

What is claimed as deserving the protection of Letters Patent:

1. A gripping device comprising:
a support;
at least one guide member retained by the support;
a motor;
first and second gripping arms movable with respect to one another and retained relative to the support to travel along the at least one guide member wherein the first and second gripping arms have a first position where the first and second gripping arms are in proximity, the first position comprising a clamping position, and a second position where the first and second gripping arms are moved apart with respect to the first position, the second position comprising a slack position;
a drive mechanism driven by the motor wherein the drive mechanism drives the first and second gripping arms with respect to one another at least from the slack position to the clamping position; wherein the drive mechanism comprises an actuating mechanism that acts on the first gripping arm, the first gripping arm comprising an operating gripping arm; wherein the drive mechanism further comprises an interconnection mechanism that interconnects the operating gripping arm and the second gripping arm, the interconnection mechanism operative to induce simultaneous and opposite movement of the second gripping arm in response to movement of the operating gripping arm, and wherein the interconnection mechanism comprises a cogwheel rotatably retained by the support in combination with first and second racks, the first rack fixed relative to the first gripping arm and the second rack fixed relative to the second gripping arm wherein the cogwheel is drivingly engaged with the first and second racks such that a movement of the first rack will induce a rotation of the cogwheel and a rotation of the cogwheel will induce a movement of the second rack.

2. The gripping device of claim 1 wherein the cogwheel and the first and second racks are drivingly engaged by meshing.

3. The gripping device of claim 1 wherein the cogwheel is mounted to the support to rotate about a fixed axis of rotation.

4. A gripping device comprising:
a support;
at least one guide member retained by the support;
a motor;
first and second gripping arms movable with respect to one another and retained relative to the support to travel along the at least one guide member wherein the first and second gripping arms have a first position where the first and second gripping arms are in proximity, the first position comprising a clamping position, and a second position where the first and second gripping arms are moved apart with respect to the first position, the second position comprising a slack position;
a drive mechanism driven by the motor wherein the drive mechanism drives the first and second gripping arms with respect to one another at least from the slack position to the clamping position; wherein the drive mechanism comprises an actuating mechanism that acts on the first gripping arm, the first gripping arm comprising an operating gripping arm; wherein the drive mechanism further comprises an interconnection mechanism that interconnects the operating gripping arm and the second gripping arm, the interconnection mechanism operative to induce simultaneous and opposite movement of the second gripping arm in response to movement of the operating gripping arm;
wherein the actuating mechanism is operative to induce straight-line actuation of the operating gripping arm to move the operating gripping arm in translation along the at least one guide member.

5. A gripping device comprising:
a support;
at least one guide member retained by the support;
a motor;
first and second gripping arms movable with respect to one another and retained relative to the support to travel along the at least one guide member wherein the first and second gripping arms have a first position where the first and second gripping arms are in proximity, the first position comprising a clamping position, and a second position where the first and second gripping arms are moved apart with respect to the first position, the second position comprising a slack position;
a drive mechanism driven by the motor wherein the drive mechanism drives the first and second gripping arms with respect to one another at least from the slack position to the clamping position; wherein the drive mechanism comprises an actuating mechanism that acts on the first gripping arm, the first gripping arm comprising an operating gripping arm; wherein the drive mechanism further comprises an interconnection mechanism that interconnects the operating gripping arm and the second gripping arm, the interconnection mechanism operative to induce simultaneous and opposite movement of the second gripping arm in response to movement of the operating gripping arm;
wherein the actuating mechanism comprises a screw-nut mechanism formed by interaction of a first component and a second component wherein the first component is fixed against rotation by the at least one guide member, wherein the second component is rotatable by operation of the motor to induce a translation of the first component along the at least one guide member, and wherein the first component is operable to induce straight-lined translation of the operating gripping arm in response to translation of the first component along the at least one guide member.

6. The gripping device of claim 5 wherein the at least one guide member comprises plural guide rods retained by the support wherein the first component is slidably retained by the plural guide rods.

7. The gripping device of claim 5 wherein the first component comprises a nut slidably engaged with the at least one guide member, wherein the second component comprises an operating screw, and wherein translation of the nut relative to the at least one guide member induces translation of the operating arm.

8. A gripping device comprising:
a support;
at least one guide member retained by the support;
a motor;
first and second gripping arms movable with respect to one another and retained relative to the support to travel along the at least one guide member wherein the first and second gripping arms have a first position where the first and second gripping arms are in proximity, the first position comprising a clamping position, and a second position where the first and second gripping arms are moved apart with respect to the first position, the second position comprising a slack position;
a drive mechanism driven by the motor wherein the drive mechanism drives the first and second gripping arms with respect to one another at least from the slack position to the clamping position; wherein the drive mechanism comprises an actuating mechanism that acts on the first gripping arm, the first gripping arm comprising an operating gripping arm; and wherein the drive mechanism further comprises an interconnection mechanism that interconnects the operating gripping arm and the second gripping arm, the interconnection mechanism operative to induce simultaneous and opposite movement of the second gripping arm in response to movement of the operating gripping arm; and
a clamping limitation mechanism operative to measure clamping force transmitted by the first and second gripping arms toward the clamping position and to limit the force transmitted by the first and second gripping arms toward the clamping position thereby to prevent the application of excessive clamping force.

9. The gripping device of claim 8 wherein the clamping limitation mechanism includes a resilient member and wherein the actuating mechanism applies force to the operating gripping arm through the resilient member of the clamping limitation mechanism whereby the resilient member is distorted by force applied by the first and second gripping arms.

10. The gripping device of claim 9 wherein the resilient member of the clamping limitation mechanism comprises a spring.

11. The gripping device of claim 9 wherein the resilient member of the clamping limitation mechanism comprises a resiliently compressible member interposed between the actuating mechanism and the operating gripping arm.

12. The gripping device of claim 11 wherein the at least one guide member comprises at least one guide rod retained by the support, the resiliently compressible member comprises a helical spring, and wherein the helical spring receives the at least one guide rod in a substantially concentric manner.

13. The gripping device of claim 12 wherein the helical spring has a first end disposed to engage the actuating mechanism and a second end disposed to engage the operating gripping arm whereby the helical spring is compressed when the operating gripping arm exerts force during movement to the clamping position.

14. The gripping device of claim 9 wherein the clamping limitation mechanism further comprises a sensor disposed to detect distortion of the resilient member.

15. The gripping device of claim 14 wherein the sensor comprises an optical sensor and wherein the clamping limitation mechanism further comprises a detectable member, wherein the optical sensor is retained by one of the actuating mechanism and the operating gripping arm, and wherein the detectable member is retained by the other of the actuating mechanism and the operating gripping arm.

16. The gripping device of claim 15 wherein the clamping limitation mechanism automatically limits force applied by the actuating mechanism based on a predetermined distortion of the resilient member.

17. The gripping device of claim 16 further comprising at least one marker on the detectable member and wherein the optical sensor is operative to detect the presence or absence of the at least one marker.

18. The gripping device of claim 17 wherein the optical sensor is retained by the actuating mechanism and wherein the detectable member is retained by the operating gripping arm to extend toward the actuating mechanism whereby the optical sensor is operative to detect a compression of the resilient member.

19. A gripping device comprising:
a support;
at least one guide member retained by the support;
a motor;
first and second gripping arms movable with respect to one another and retained relative to the support to travel along the at least one guide member wherein the first and second gripping arms have a first position where the first and second gripping arms are in proximity, the first position comprising a clamping position, and a second position where the first and second gripping arms are moved apart with respect to the first position, the second position comprising a slack position;
a drive mechanism driven by the motor wherein the drive mechanism drives the first and second gripping arms with respect to one another at least from the slack position to the clamping position; wherein the drive mechanism comprises an actuating mechanism that acts on the first gripping arm, the first gripping arm comprising an operating gripping arm; wherein the drive mechanism further comprises an interconnection mechanism that interconnects the operating gripping arm and the second gripping arm, the interconnection mechanism operative to induce simultaneous and opposite movement of the second gripping arm in response to movement of the operating gripping arm; and
a drag link retained by the actuating mechanism to engage the operating gripping arm during a movement toward the slack position wherein the drag link has a shoulder that engages the operating gripping arm to move the operating gripping arm toward the slack position.

20. The gripping mechanism of claim 19 wherein the actuating mechanism includes an elongate member and wherein the drag link comprises a cylindrical member disposed to receive the elongate member of the actuating mechanism in a substantially concentric manner.

21. The gripping mechanism of claim 20 wherein the elongate member of the actuating mechanism comprises a screw and wherein the actuating mechanism further comprises a nut translated by a rotation of the screw.

22. A gripping device comprising:

a support;

at least one guide member retained by the support;

a motor;

first and second gripping arms movable with respect to one another and retained relative to the support to travel along the at least one guide member wherein the first and second gripping arms have a first position where the first and second gripping arms are in proximity, the first position comprising a clamping position, and a second position where the first and second gripping arms are moved apart with respect to the first position, the second position comprising a slack position;

a drive mechanism driven by the motor wherein the drive mechanism drives the first and second gripping arms with respect to one another at least from the slack position to the clamping position; wherein the drive mechanism comprises an actuating mechanism that acts on the first gripping arm, the first gripping arm comprising an operating gripping arm; wherein the drive mechanism further comprises an interconnection mechanism that interconnects the operating gripping arm and the second gripping arm, the interconnection mechanism operative to induce simultaneous and opposite movement of the second gripping arm in response to movement of the operating gripping arm; and wherein the support comprises a robotic arm.

23. A bacteriological incubator comprising a gripping device according to claim 22 wherein the robotic arm is arranged to seize bacteriological culture containers.

* * * * *